US011537753B2

(12) United States Patent
Creti et al.

(10) Patent No.: US 11,537,753 B2
(45) Date of Patent: Dec. 27, 2022

(54) METHOD AND DEVICE FOR DYNAMIC CONTROL, AT FILE LEVEL, OF THE INTEGRITY OF PROGRAM FILES IN A PERSISTENT MEMORY OF A COMPUTER, COMPUTER PROGRAM AND COMPUTER INCORPORATING SAME

(71) Applicant: BULL SAS, Les Clayes-sous-Bois (FR)

(72) Inventors: Luc Creti, Vauhallan (FR); Dominique Tronche, Paris (FR); Jean-Michel Lenott, Plaisir (FR)

(73) Assignee: BULL SAS, Les Clayes-sous-Bois (FR)

( * ) Notice: Subject to any disclaimer, the term of this patent is extended or adjusted under 35 U.S.C. 154(b) by 16 days.

(21) Appl. No.: 17/210,430

(22) Filed: Mar. 23, 2021

(65) Prior Publication Data

US 2021/0342484 A1 Nov. 4, 2021

(30) Foreign Application Priority Data

Mar. 27, 2020 (FR) ...................................... 2003076

(51) Int. Cl.
*G06F 21/64* (2013.01)
*G06F 21/71* (2013.01)
(Continued)

(52) U.S. Cl.
CPC ............ *G06F 21/64* (2013.01); *G06F 21/604* (2013.01); *G06F 21/6218* (2013.01); *G06F 21/78* (2013.01)

(58) Field of Classification Search
None
See application file for complete search history.

(56) References Cited

U.S. PATENT DOCUMENTS

| 11,086,525 B2 * | 8/2021 | Stabrawa ............... G06F 3/0611 |
| 2009/0055604 A1 * | 2/2009 | Lemar .................. G06F 16/174 |
| | | 711/E12.001 |

(Continued)

FOREIGN PATENT DOCUMENTS

| WO | 2011042306 | 4/2011 |
| WO | 2013166126 | 11/2013 |

OTHER PUBLICATIONS

Study of the Dirty Copy on Write, a Linux Kernel Memory Allocation Vulnerability. Farah. IEEE. (Year: 2017).*

(Continued)

*Primary Examiner* — Venkat Perungavoor
(74) *Attorney, Agent, or Firm* — Arc IP Law, PC; Joseph J. Mayo

(57) ABSTRACT

A method is disclosed for dynamic control, at file level, of an integrity of a set of files stored in a persistent memory of a computer. The method includes mounting an overlay file system of the Overlayfs type, with a "lower" directory containing the files which is marked as read-only, and with an "upper" directory containing any file resulting from a modification of the files of the "lower" directory by virtue of a copy-on-write mechanism. A denylist of files from the "lower" directory to be excluded from the integrity control is created and maintained. An integrity violation of a file is detected if a copy of said file is identified in the "upper" directory. The method also includes containerization, which natively implements file mounting by overlays of the Overlayfs type.

12 Claims, 6 Drawing Sheets

(51) Int. Cl.
  *G06F 21/60*  (2013.01)
  *G06F 21/62*  (2013.01)
  *G06F 21/78*  (2013.01)

(56) References Cited

U.S. PATENT DOCUMENTS

| | | | | |
|---|---|---|---|---|
| 2009/0055607 | A1* | 2/2009 | Schack | G06F 16/174 |
| | | | | 711/E12.103 |
| 2011/0082838 | A1* | 4/2011 | Niemela | G06F 21/566 |
| | | | | 711/E12.001 |
| 2013/0275973 | A1 | 10/2013 | Greenfield et al. | |
| 2015/0193315 | A1* | 7/2015 | Cheong | G06F 11/1466 |
| | | | | 714/15 |
| 2018/0129666 | A1 | 5/2018 | Havewala et al. | |
| 2018/0285566 | A1* | 10/2018 | Borlick | G06F 21/50 |
| 2019/0272204 | A1* | 9/2019 | Jobi | G06F 9/545 |
| 2019/0311047 | A1* | 10/2019 | Guerra Delgado | G06F 16/188 |
| 2021/0042141 | A1* | 2/2021 | De Marco | G06F 16/148 |

OTHER PUBLICATIONS

A novel integrity measurement method based on copy-on-write for region in virtual machine. Li. Elsevier. (Year: 2019).*
TotalCOW: Unleash the Power of Copy-On-Write for Thin-provisioned Containers. Wu.ACM. (Year: 2015).*
Near-Real-Time Inference of File-Level Mutations from Virtual Disk Writes. Richter. (Year: 2012).*
Preliminary Search Report issued in FR2003076, dated Oct. 28, 2020 (2 pages).

* cited by examiner

METHOD AND DEVICE FOR DYNAMIC CONTROL, AT FILE LEVEL, OF THE INTEGRITY OF PROGRAM FILES IN A PERSISTENT MEMORY OF A COMPUTER, COMPUTER PROGRAM AND COMPUTER INCORPORATING SAME

BACKGROUND OF THE INVENTION

Field of the Invention

Embodiments of the relates generally to the field of computer system security, and more particularly to dynamic control of the integrity of a set of files in the persistent memory of a computer.

More particularly, the invention proposes a method and a device for dynamic control, at file level, of the integrity of program files in a persistent memory of a computer, as well as a computer program implementing said method, and a computer incorporating said device.

The application thereof relates in particular to computer systems, providing solutions for increasing their security.

Description of the Related Art

Generally, data integrity denotes the state of data which are not subject while in use, at rest or in transit, to any modification or destruction whether intentional or accidental, and retain a format allowing their use. In fact, the expression "integrity" used in connection with data corresponds to concepts that differ slightly according to context, even though the general principle is the same: namely that the data must not have been modified since their creation (in the broad meaning).

Firstly, cryptography seeks to prove that the data have or have not been modified in order to verify that there has been no falsification, which is often carried out using a hash function which condenses the file into a unique binary value known as a "digest".

In telecommunications, it is desirable to be able to detect and often correct modifications to data which may result from a malicious action but which in general simply result from transmission errors arising from imperfections of the physical transmission channel such as interference, multiple paths in radiocommunications, echo phenomena, etc. Another example is that of a file download from the Internet. There are (non-negligible) risks of their being corrupted on account of problems of the quality of data transmission on the network, or degradation due to viruses or other causes. It is therefore prudent to verify the integrity of the data by comparing a fingerprint, for example a checksum, of the original file with that of the downloaded file. This is simply to verify that the downloaded file is exactly the same as the original. For example, a software file may contain malware without altering its size and its other characteristics, but it would not have the same fingerprint.

Lastly, in the field of data processing systems, or computers in the broad meaning, integrity is a principle according to which a data processing system is protected against malfunctions, hacks and attacks. The aim is to ensure that the processing carried out by the system is complete, accurate, rapid and authorized. Hardware systems for integrity control exist, ensuring the verification of checksums during exchanges between electronic cards (such as network cards), hard disks or memories. Integrity control software, such as Tripwire™ for example, also exists.

Furthermore, the general concept of verification of the integrity of a set of files is already known.

Thus, for example, a file integrity manager (FIM) tool allows the integrity of a plurality of files to be managed. For example when a 3 TB picture library comprising hundreds or even thousands of files must be transferred from one disk to another disk, FIM makes it possible to verify that no file has been damaged or changed during the transfer. FIM creates a sort of index of the hash of each file and records their state at a specified time in a file with the extension .fim. Then it compares the transferred versions with those notified in the .fim file. Thus, it is clearly apparent if among these 3 TB of data, files have been deleted, corrupted, modified, copied, renamed or duplicated. FIM is available under the GPLv3 licence.

Moreover, certain operating systems, such as Linux, or the "Linux-like" operating systems, have commands that allow the creation and the integrity verification of a file system. For example, on a Linux system, the command mkfs allows a file system to be created on a Linux system, and the command fsck allows the integrity of the metadata of the file system to be verified. The integrity of the files themselves is not verified by fsck. On the other hand, certain file systems such as zfs are capable of detecting non-malicious changes to the integrity of the files when the latter are due to errors of the storage media.

In the field of computer system security, when a computer attack is launched on a computer, the attacker may want to modify, add or delete files on the targeted computer. One of the aims of these deletions, additions or modifications is in particular to render the attack persistent, as in the case of attacks of the advanced persistent threat (APT) type which have been much in the news.

In fact, the attack techniques often consist of exploiting a weakness in the operating system of the machine in order to make it execute unintended tasks. The extent of a given weakness may be limited to modifying the random access memory of the computer allocated to the process under attack. But the modifications carried out by the attacker are then lost on restarting the machine, and the attack has to be re-run in order to modify the behaviour of the targeted computer again.

However, the aim of the attacker may be to make an enduring modification to the behaviour of a targeted machine, in order to carry out tasks for example of long-term data theft. In this case, rather than executing the attack again after each restart of the machine, which can be complex and the result of which may be uncertain or even impossible to obtain, the attacker prefers to attempt to modify files stored in the persistent memory of the computer (typically a hard disk), in order to obtain re-execution of their malicious acts when the computer is restarted, and thus avoid the trouble of carrying out the attack again.

In order to mitigate the effects of this type of attack, it is desirable to be able to ensure the integrity of the files contained in the persistent memory of a computer and to be capable of launching a warning in the event of proven intrusion. A person skilled in the art will appreciate that this protection measure does not prevent success of the attack itself, but only protects from its effects, since it intervenes when the attack has already taken place. Therefore here, the field known as "defence in depth" is concerned, which aims to reduce the risk involved when a particular security component is compromised or malfunctioning.

Several approaches can be used to try to guarantee the integrity of the persistent storage of a computer, depending on the desired "level" of standpoint with respect to the different hardware and software layers involved in the implementation of the persistent storage. It is thus possible to consider one of the approaches from the following ordered list:

use of read-only storage hardware;
integrity verification at the level of the bitstream produced by the file system;
integrity verification at the level of the file system blocks; or,
integrity verification at file level.

Each of these approaches gives rise to an increase in the difficulty of implementation with respect to the previous one in the list, while bringing additional flexibility of use.

For example, if the last two approaches of the list are compared, a person skilled in the art can appreciate that a verification at the level of the file system blocks will detect a false positive if the file is simply "moved" by the file system, even though the content of the file has not changed. On the other hand, within the framework of integrity verification at file level, the content of the file must be taken into account, but also its metadata such as its date and time of creation or of last modification, so that the risk of false positive as described above, which is incurred with block-level integrity verification, is avoided here.

If an approach is followed by verification at file level, the number of parameters to be taken into account is substantial, in particular as a result of taking account of metadata associated with the files to be controlled. For this reason, an integrity control database must be constituted, enumerating all of these parameters for each of the files and directories to be verified. Constituting this database is a complex operation. Moreover, it must be reiterated when a file is added, in order to ensure that all the metadata of the files have indeed been taken into account, particularly since new metadata may have been introduced by new versions of the file systems.

In the context of the invention, integrity verification methods at file level are the principal focus. In fact, the other solutions from the list given above involve constraints on the operation of the data-processing machine platform which render them less versatile.

While it is relatively easy to develop a method and a device for controlling the integrity of the files on startup of the machine (known as "static integrity verification"), and to interrupt this startup in the case of proven corruption, on the other hand it is much more complicated to carry out these controls dynamically (known as "dynamic integrity verification") during the normal operation of the machine without the need to institute complex developments within the core of the operating system.

Document WO2013166126 discloses a method making it possible to provide a dynamic integrity attestation of the security of the applications of one or more networked data processing systems, capable of undertaking different types of integrity attestation. A description is given of the case of a user peripheral infected by a type of persistent threat, in the form of malware that is undetectable at this stage by conventional technologies (antivirus, for example), and when no signature or denylist already exists for this threat. According to the solution described in WO2013166126, an endpoint confidence agent monitors the malware process in the course of execution on the system, carries out integrity controls of files and components, in particular by verifying a file hash digest or digital signature. The certificate chain is verified by making use of the collaboration services, such as the collaboration and assessment services, in order to access intelligent allowlist services. In the event of failure of one or more of these verifications, an alert provides for the malicious process to be immediately placed on a monitoring list. The process is then permanently monitored by the integrity processor in order to detect violations of explicit rules. Once a criterion for triggering a rule is reached, the confidence agent initiates image integrity verification and uses a remote malware analyzer. The image profile generated provides the integrity processor with additional local events to monitor for the suspect process. At this stage, the malware analyzer signals the capabilities detected by static and dynamic methods. The integrity processor then monitors the suspect process for the associated warnings and triggers events such as alerts. Moreover, according to WO2013166126 several endpoint assessment services can be deployed on the network to carry out scheduled analyses based on determined strategies, in order to detect known exposures.

Document WO2011042306 discloses a method intended to reduce the risk that a correctly saved file is overwritten by a corrupted file. To this end, it proposes monitoring a file system. More precisely, the method can comprise monitoring the file system in order to detect patterns in several write operations that indicate the activity of malware on the data processing system and/or defects in the data processing system. When a file backup process detects a modification in a file and when, conventionally, the original file is copied and saved to a backup location, the backup process first uses the integrity control mechanism to determine if the file data are correct. For example, the process can use a suitable algorithm to generate a checksum and compare the checksum generated with that saved in the file or the file header. If the integrity verification proves that the file is intact, a backup copy is created and saved, and any previous backup copy is overwritten. If on the other hand the file proves not to be intact, no backup copy is saved and an alert is sent to the computer user.

Thus, there is a need for a new method, device or system allowing dynamic control of the integrity of a set of files, preferably for computers in their persistent memory.

Technical Problem

The purpose of the invention is therefore to overcome the drawbacks of the prior art. In particular, the invention aims to improve the dynamic control of the integrity, at file level, of a set of program files stored in the persistent memory of a computer.

This aim is achieved by virtue of a technique making it possible to detect any modifications introduced to any one of the set of program files to be controlled, and thus to ensure the integrity of the program files and more broadly the computer system security of a data-processing machine at file level. Thus persistent attacks, such as the APT type of attacks mentioned in the introduction, can be blocked.

BRIEF DESCRIPTION OF THE INVENTION

To this end, there is proposed a method for dynamic control, at file level, of the integrity of a set of files stored in a persistent memory of a computer, said method comprising:

allocating a first memory space in the persistent memory of the computer, in which are stored files the integrity of which must be controlled;
allocating a second memory space in the persistent memory of the computer, separate from the first memory space;
locking as read-only, the first memory space containing the files the integrity of which must be controlled;

implementing a copy-on-write mechanism with respect to the files contained in the first memory space, ensuring the creation of a copy of at least one of said files in the second memory space when the at least one file is modified and redirecting all instances of subsequent access to the at least one file to said copy of the at least one file in the second memory space;

creating a list, said created list corresponding to a list called denylist, of files from the second memory space to be excluded from the integrity control, or to a list called allowlist, of files from the second memory space to be included in the integrity control;

dynamic inspection, at predetermined times during the operation of the computer, of the second memory space in order to identify files therein with the exception of the files from the denylist or to identify files therein from the allowlist;

detecting an integrity violation of a file among the files the integrity of which must be controlled, stored in the first memory space, if a copy of said file is identified in the second memory space; and at least one predetermined action, executed in response to the detection of an integrity violation of a file from among the files the integrity of which must be controlled, from the first memory space.

The copy-on-write (or COW) can be implemented while specifying that the files in the first memory space are read-only, and that when modifications are introduced to said files by any process, an exception is raised and is managed by the core of the operating system by allocating memory for a second memory space and by providing for the modified object to be stored in said second memory space.

In particular when this technique is applied to the program files stored in the first memory space, provided that the file accessed is only used as read, only the original exists, in the first memory space. When writing to the file takes place, or a modification of its metadata, or even deletion of the file, a copy of the file is made in the second memory space and all the modifications to the file are redirected to said copy of the file in the second memory space, so that the original version in the first memory space coexists with the modified version in the second memory space.

The method makes it possible to optimise the integrity control of the program files in the persistent memory of the computer, by simplifying anomaly detection on the one hand, and by reducing the resources necessary for this detection on the other hand. The integrity control obtained is therefore integrity control at file level, which is simple and efficient.

The method makes it possible in particular to improve the efficiency of detection while reducing the constraints associated with this detection. It has a relatively low difficulty of implementation, while providing a relatively high flexibility of use. In other words, the invention makes it possible to break with the paradigm associated with the choice required between the four integrity control approaches presented in the introduction, according to which one of these approaches must be selected while compromising between the difficulty of implementation and the flexibility of the possible uses. Moreover, an advantage of the method is linked to the absence of calculations of signatures via hash functions for carrying out the integrity control, which are long calculations with heavy consumption of resources for the processing devices implementing them.

The method is based on the observation that corruption of the integrity of a file necessarily takes place via its modification, such a modification possibly also consisting of deleting the file or changing its metadata. It uses an architecture based on a file system comprising a first memory space containing the files the integrity of which must be controlled, and on rules for managing the associated files in a particular and original manner. In fact, on the one hand the files stored in the first memory space cannot be modified, given that said first memory space is marked as read-only. And on the other hand, all the modifications (including deletions of files and modifications of metadata) introduced to the files are the subject of a modification of the second memory space, in order to save therein the version thus modified of the files involved.

The file list used within the framework of embodiments of the invention can adopt two forms: a list corresponding to the files of the second memory space to be controlled, known as "allowlist" and a list corresponding to the files of the second memory space that are not to be controlled, known as "denylist". With the implementation of the list which excludes all the other files of the second memory space that are not to be controlled (list known as "denylist" within the meaning of embodiments of the invention), said second memory space "filtered" by the denylist contains only files from the first memory space that have suffered an integrity violation. In other words, simply the appearance in the second memory space of a file not excluded from the integrity control by the effect of the denylist is the sign of the integrity violation of the corresponding file which is stored in the first memory space. With the implementation of the list which includes exclusively the files of the second memory space to be controlled (list known as "allowlist" within the meaning of embodiments of the invention), said second memory space "filtered" by the allowlist contains only files from the first memory space that have suffered an integrity violation. In other words, simply the appearance in the second memory space of a file from the allowlist is the sign of the integrity violation of the corresponding file which is stored in the first memory space. Thus, the dynamic inspection by virtue of the list created (allowlist or denylist) can, during the operation of the computer and with minimum consumption of resources, identify files with the exception of the files from the denylist or to identify files from the allowlist, for example by implementing filtering of the verified files of the second memory space on the basis of the allowlist or denylist.

Advantageously, the fact that all the files contained in the second memory space are subject to the integrity control save for those which have been explicitly included in the denylist or list of the files not to be controlled, makes it possible to guarantee that no metadata item, even if it does not yet exist at the time of installation of the system, can be omitted from the integrity control. Thus, preferably, the list created corresponds to a denylist and the dynamic inspection of the second memory space makes it possible to identify files therein, with the exception of the files of said denylist. The presence alone of any file in the second memory space with the exclusion of the files of the denylist can be interpreted as the detection of a violation or of a risk of violation of the integrity of a file stored in the first memory space.

Advantageously, the method does not require iterations for building a database associated with the integrity control.

The control rules can be of the "allowlist" or "denylist" type. Thus, the list created can correspond to an allowlist and the dynamic inspection of the second memory space makes it possible to identify therein files from said allowlist. In this case, the presence alone of any file in the second memory space corresponding to the files of the allowlist can be interpreted as the detection of a violation or of a risk of violation of the integrity of a file stored in the first memory space.

The system improves the performance of the verification phase with respect to the existing techniques, in particular by the fact that there is no need to be concerned with the content of the files.

This performance improvement makes it possible to reduce the time interval between two successive integrity verifications, and thus the duration between two successive iterations of the integrity control, thus allowing more rapid detection of a possible attack.

When the files to be controlled contained in the first memory space each contain program code, for example program code associated with security applications, the list created, such as the denylist, can be adapted in order to identify in particular any data file created, modified and/or deleted in the second memory space by said security applications or by other applications the program files of which are also contained in the second memory space, as well as said program files corresponding to said other applications, if appropriate.

In such a case, the presence alone of any file in the second memory space with the exclusion of the files of the denylist can then be interpreted as the detection of a violation of the integrity of a file stored in the first memory space.

In a first mode of implementation, the method can comprise mounting a file system by overlay, with the first memory space as lower directory which contains the files the integrity of which must be controlled, and which is marked read-only, and with the second memory space as upper directory, containing any file resulting from a modification, a creation or a deletion of the files, the integrity of which must be controlled, from the lower directory.

An action executed in response to the detection of an integrity violation of one of the files the integrity of which must be controlled of the first memory space can be any action intended to inform and/or correct such as an alert, sending the identified file for analysis, locking the system or even deletion of the identified file. Preferably, an action executed in response to the detection of an integrity violation of a file of the first memory space can be a corrective action, intended to remove the identified presumed corrupted file.

In an alternative mode of implementation, the method can comprise the implementation of a containerization platform, in which each container comprises the first memory space as a read-only overlay common to all the containers using the same file image the integrity of which must be controlled, and also comprises the second memory space as a read-write overlay specific to each container and which contains all the modifications introduced to the container.

This implementation can comprise the creation of a list of containers to be monitored, and, for each container to be monitored, the creation of a denylist of the files of said container to be excluded from the integrity control. Alternatively, this implementation can comprise the creation of a list of containers to be monitored, and, for each container to be monitored, the creation of an allowlist of the files of said container to be included in the integrity control.

Moreover, when the files to be controlled each contain program code associated with applications, for example program code associated with security applications, the list created, such as the denylist, can be adapted to identify any temporary file created, modified and/or deleted in the second memory space by said applications.

In such a case, the presence alone of any file in the second memory space with the exclusion of the files of the denylist can advantageously be interpreted as the detection of a violation of the integrity of one of the files the integrity of which must be controlled, stored in the first memory space.

Still in the case of the second implementation, on the basis of containers, an action executed in response to the detection of an integrity violation of a file of the first memory space can be a corrective action comprising restarting the computer.

In one or other of the two above implementations, an action executed in response to the detection of an integrity violation of a file of the first memory space can be generating an alert, for example in a security audit log intended for a computer administrator, stopping the computer or putting the computer in safe mode.

Moreover, verification of the first directory can be carried out at substantially regular time intervals, for example periodically, for example approximately once per minute. The frequency of the verifications is only limited by the global performance of the method, and as the method is relatively more efficient than the known methods, inasmuch as only certain zones are controlled, so that its implementation only needs few resources, a verification frequency as rapid as for example once per minute can be envisaged. By virtue of this verification frequency, an integrity attack can be detected more rapidly and correlatively actions can be engaged more rapidly, so that the consequences of the attack can be limited.

In a second aspect, a further subject of the invention is a data-processing device having suitable means, in particular software means, to execute all the steps of the method according to the above first aspect. This may be for example a computer configured for this purpose, for example a computer on which an operating system runs with an overlay file system of the Overlayfs type or a container architecture of the Docker™ type or similar, provided with corresponding functionality. Furthermore, the data necessary for the dynamic inspection as well as the list(s) created, can be placed in a memory zone protected by a low-level integrity control system. For example, the data necessary for said dynamic inspection as well as the list(s) created, can be placed in a protected space of the core of the computer operating system.

A third aspect of the invention relates to a data processing system comprising a device according to the above second aspect. This can be a general-use computer with its peripherals, a network of interconnected computers and peripherals, a high-performance centralized or distributed computer, etc.

In a fourth and last aspect, a further subject of the invention is a computer program product comprising one or more sequences of instructions stored on a machine-readable memory media comprising a processor, said sequences of instructions being suitable for carrying out all the steps of the method according to the first aspect of the invention when the program is read from the memory media and executed by the processor. This may be a file storage management application, or an operating system, for example.

BRIEF DESCRIPTION OF THE DRAWINGS

Other characteristics and advantages of the invention will become more apparent on reading the following description. The latter is purely illustrative and must be read with reference to the attached drawings in which.

In the description of embodiments that will follow and in the figures of the attached drawings, the same elements or similar elements bear the same numerical references as the drawings.

DETAILED DESCRIPTION OF THE INVENTION

Figure 1:
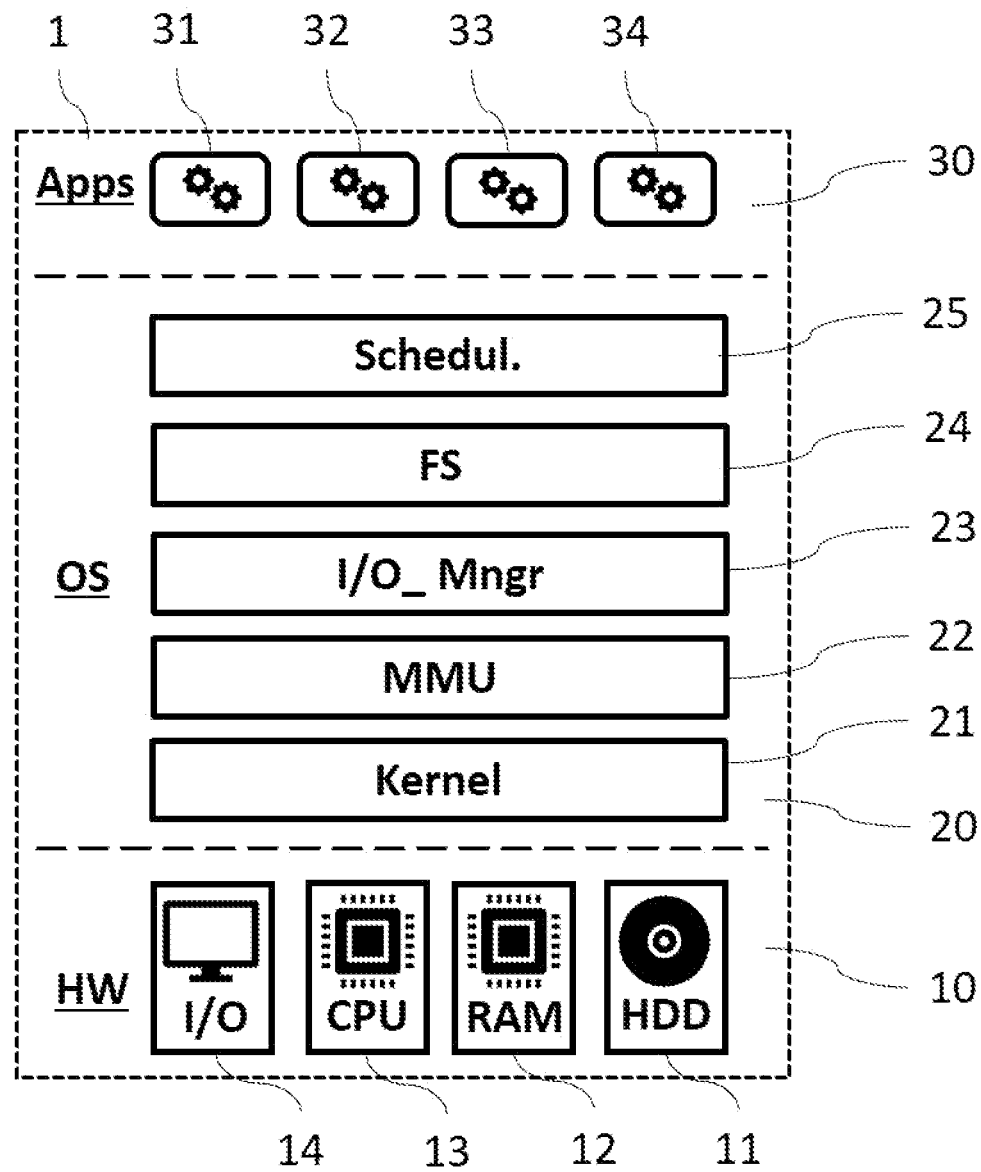
FIG. 1 is a simplified diagrammatic representation of a data processing system or computer, in which the modes of implementation of the method can be used.

Firstly, a set of definitions will be given hereinafter for certain elements of language that are used in the following description. Unless otherwise indicated, these definitions correspond in principle to the vocabulary used by a person skilled in the art in the information technology field. In case of need, for example in the event of the necessity of an interpretation of such an element of language that may deviate from the meaning usually ascribed thereto by a person skilled in the art on the basis of their general knowledge, the definition given hereinafter will take precedence.

An "operating system" (OS) is a set of programs that direct the utilization of the resources of a data-processing machine, or computer, by application software. Known operating systems are for example OS/2™, UNIX™, NetWare™, Linux™ and all the versions of the Windows™ operating system.

A "baseware" is an operating system configured in a specific manner for a given use case, intended to be used multiple times in the same configuration.

The "kernel" or "core" of an operating system is one of the fundamental parts of the operating system. It manages the resources of the computer and allows the different—hardware and software—components to communicate with one another.

An "application program", or "application software" or "data processing application" is a program (software) used directly for carrying out a given task.

A "process" is a program (or software) in the course of execution. A process (dynamic aspect, execution that can be suspended, then restarted) should not be confused with the code of an executable program (static aspect). At a given time, a process may be in various states. The core of the operating system is tasked with regulating the execution of the processes by virtue of a mechanism known as a scheduler.

A "business service" is a function specific to a given field of application, carried out by a computer program (or software).

A computer "peripheral" is a hardware device connected to a computer, which adds functionalities thereto. The peripheral is not necessarily situated outside the computer case and may not even be physically visible.

A "system driver" or simply "driver" is a computer program intended to allow another program (often an operating system) to interact with a peripheral. Generally, each peripheral has its own driver. Simplistically, the driver of a given peripheral is a software that teaches the operating system how to use this peripheral. This software is important in order to be able to use the corresponding peripheral.

In the Linux™ operating system in particular, various special files are situated in the /dev directory. These files are called peripheral, or "Linux device" or simply "device" files. They behave differently to ordinary files. Most frequently, they allow interaction with the computer hardware (the hard disk for example). These special files constitute the interface with the driver dedicated to a given hardware item forming part of the Linux™ core, driver which in turn accesses the hardware.

"Random access memory" (RAM) or "dynamic RAM" (DRAM) or "static RAM" (SRAM) is a type of electronic memory, used in particular in computers, for volatile data storage. This means that the memory loses the data that have been entrusted to it, when its power supply is cut off or the computer of which it forms part is restarted.

"Persistent memory", conversely, is a storage space, used in computers, wherein the data, once written, are durably preserved, even in the case of loss of the power supply or restart of the computer of which it forms part. This involves in particular hard disks, whether magnetic or based on solid-state electronic components (or solid state drive disk (SSD)).

A "directory" in information technology is a special file containing the addresses of other files in a memory space, whether in random access memory or persistent memory. A directory is represented symbolically by a folder in which said other files are contained. This is a concept used by most operating systems.

A "file system" or "file management system" (FMS), sometimes also called a filesystem (initialism "FS"), is a way of storing the data and organizing them in files on mass storage elements such as a hard disk, SSD disk, CD-ROM. USB key, floppy disk, etc., thus making it possible to keep significant quantities of data as well as to share them between several computer programs. The file system provides the user with an abstract view of their data and makes it possible to locate them via an access path starting from a mounting point of the file system. For the user, a file system is viewed as a tree structure: the files are grouped in directories. These directories contain either files, or recursively, other directories. Thus there is a root directory and subdirectories. Such an organization generates a hierarchy of directories and files organized as a tree.

The "objects" of a file system comprise the files and the directories for the operating systems such as OS/2™, UNIX™, NetWare™ and all the Windows operating Systems™, as well as the file system links for the UNIX™ et Linux™ operating systems.

"Mounting" a file system is the operation that allows the objects of the file system to be made accessible from the tree structure of the directories and subdirectories of the machine.

The "mounting point" of a file system is the directory starting from which the data of the file system are rendered accessible. The name of this directory is a parameter of the file system mounting operation. During this mounting operation, any contents of the mounting point (files and directories, and links under Unix) are masked and replaced by those of the file system that has been mounted.

In an "in-memory file system" the files are stored in the random access memory of the computer instead of being saved in a persistent storage zone such as a magnetic hard disk or an SSD. When the computer is restarted, all of the files retained in an in-memory file system are lost.

A "superimposition" or "overlay" file system is a particular type of file system. The operating principle of this type of file system is to give virtual visibility of a "stack" of systems of real files (actually containing data), the objects provided by one of the real layers taking precedence over the preceding ones. Known implementations of this type of file system are OverlayFS, Aufs and Unionfs.

A "layer" or "overlay" is one of the layers constituting an overlay file system.

A "container" is a set of processes that are isolated from the rest of the operating system. It runs starting from a separate image that provides all the files necessary for handling the processes that it contains. By providing an image that contains all the dependencies of an application, the container ensures the portability and the coherence of the application over various environments. Among the many existing container management systems, there may be mentioned non-limitatively Docker, LXC, Solaris Containers; or also BSD Jails, which is specific to the FreeBSD operating system.

A "container template" sometimes also called "image" is a set of files allowing multiple identical containers to be created. The content of the template defines the functionalities of the containers that will be created from this template.

In information technology an "attack" is the exploitation of a weakness in a data processing system (at the level of the operating system, software or even user level), for purposes that are unknown to the system operator and are generally harmful. An "attacker" is an agent or organization carrying out an attack.

An "advanced persistent threat" (APT) is a type of continuous clandestine computer hacking, often orchestrated by persons targeting a specific entity.

"Defence in depth", a term borrowed from a military technique intended to slow down the enemy, consists of utilizing several security techniques in order to reduce the risk when a particular security component is compromised or malfunctioning.

By the term "integrity" is meant the property associated with data which are not subject while in use, in transit or at rest, to any modification or destruction whether intentional or accidental, and retain a format allowing their use.

"Static integrity verification" is verification of the integrity of a file system on startup of the machine. Conversely, "dynamic integrity verification" is verification of the integrity of the file system while the machine is in use.

In the context of the present description, an "allowlist" is an exhaustive list of the objects (directories and/or files) the integrity of which must be controlled. Any element absent from the allowlist is not controlled. Conversely, and still in the context of the present description, a "denylist" is a list describing the files or directories excluded from the integrity control. Any element not present in this denylist is controlled by default. A person skilled in the art will appreciate that in the literature relating to computer system security, allow- and denylists are often used to denote realities that may vary substantially, according to the context and according to the meaning given by the author of the document. Thus, for example, in certain documents of the prior art, a denylist can be a list of processes considered to be malicious, while an allowlist is a list of objects considered to be secure. In other documents, a denylist is a list of corrupted files, while an allowlist is a list of objects considered to be intact. It is important to keep in mind the definition of the terms "allowlist" and "denylist" in the context of the present description, as given at the start of this paragraph.

In information technology, "hardening" is the process intended to secure a system. The approach consists mainly of reducing to the essential the objects installed (software, software libraries, tools), as well as removing non-essential users and rights, while retaining the required functionalities. The underlying principle is the reduction of the possible attack surface, considering that any installed object is potentially a source of vulnerability (exploit). Reducing the number of installed objects therefore reduces the number of possible weaknesses, for a given system. Hardening also includes the modification of certain default configurations of the operating system in order to improve the strength thereof, for example the use of a stronger algorithm than the one used by default for verifying passwords.

A "corrective action" is an action that can be run, for example, in response to the detection of an integrity violation of a file, intended to remove the corrupted file. More generally, this is an action intended to remove a weakness detected in the data processing system or the cause of a nonconformity, in order to prevent its reappearance. A nonconformity may have several causes; it is sometimes necessary to combine several actions in order to eliminate the source of error. A corrective action is made out from the following actions: preventive action (which aims to prevent the occurrence of the nonconformity) and curative or corrective action (which aims to correct the nonconformity and not its cause).

By "hash function" is meant a type of function which calculates, from a data item provided at input, a digital fingerprint serving to rapidly identify the initial data item. Hash functions are used in information technology and in cryptography in particular for rapid recognition of files or passwords.

"Live data" (or working data) are the data used and/or produced by a machine, which change in a rapid lifecycle, making their change unpredictable. A data file containing such live data is distinguished from a program file, which contains program code that changes only rarely in the case of replacement of the code by an updated version, or not at all.

"Copy-on-write (COW)", (also called "lazy copy" or "implicit sharing") is a programming technique implemented by most modern operating systems making it possible to avoid unnecessary copies of large objects, by making the copy only when an object is modified. The idea behind this mechanism is that if multiple calling processes request access to a shared file, for example, they can be given respective pointers to the same file in the memory. This fiction can be maintained until a calling process modifies the file. At this time, a private copy of the file is created, elsewhere in the memory, which belongs to the process in question. This takes place transparently for the calling processes. The main advantage is that if a calling process never makes any modifications, the private copy is never created. This mechanism uses only a small quantity of additional storage space, while having a low impact on the system performance. Moreover, if an error leads to the loss or corruption of the data file, the data can be rapidly restored from the original file.

Finally, a "bitstream" is defined as a bit sequence.

Now that the above definitions have been introduced, example embodiments of the invention will be disclosed.

The use of any data processing system (computer) implies the execution of a program thereby; this is why any application requires hardware (HW), in this case one or more central processing units (CPU), random access memory (RAM), or primary memory, input/output peripherals (generally denoted I/O), storage peripherals (persistent memory or secondary memory), such as hard disk drives (HDD) or SSD memories, optical media such as CD-ROM, USB keys, etc. on the one hand, and software (SW) that is executed by said computer, on the other hand. Software is divided into two families, namely system programs and application programs (simply called "applications" or "Apps"). The most important of the system programs is the operating system (or OS).

In the present description, unless otherwise specified, the example of a data processing system operating under the Linux™ operating system, which is very similar to the Unix operating system, will be adopted. A person skilled in the art will appreciate, however, that this is an example only, and that the invention is not intended to be limited to the particular case of a system operating under Linux™. On the contrary, the implementation of embodiments is possible on data processing systems operating under other OSs, and is within the scope of a person skilled in the art on the basis of the technical teaching disclosed in the present description.

The data processing system as a whole is organized in "layers". Each layer of the data processing system conceals the lower layers. Thus the upper layers are independent of the lower layers. The operating system is the software layer that acts as interface between the applications and the hardware, i.e. which makes the capabilities provided by the hardware available to the application programs. The operating system conceals the hardware layer. For that reason, an application intended to be executed on a given operating system is independent of the particular elements constituting the hardware of the system.

The main tasks that fall to the operating system are in particular the following:
  multiprogramming, timesharing and parallelism; the programs in memory must share the calculation resources constituted by the CPU(s), and the scheduler of the operating system decides which program "has the ball in hand" at each moment; this function is provided by a scheduler;
  managing the secondary memory (or persistent memory): each user stores programs and data in files entrusted to the system, which are stored on a storage peripheral. This function is provided by the filesystem manager, more simply known in shortened form as "filesystem";
  executing input/output commands received from the applications, which is provided by an input/output or "I/O" manager;
  managing the main memory (or random access memory), which is provided by a memory management unit (MMU), also more simply called memory manager;
  interpreting the language of dialogue with the user, provided by a command interpreter (or "shell"), which is a program executing in the user space and has no particular link with the core ("kernel") of the operating system; It is possible to have several different shells installed on one and the same machine and used simultaneously; and
  applying security rules, in particular access rights to the files: read-only (r), read-write (rw), and if appropriate execute (x) under Linux™ for example. This sensitive function also falls to the core. On any Unix system, there is a superuser, generally called "root", which has full authority. It can freely access all the resources of the computer, including instead of another user, i.e. under their identity. Generally, at least on production systems, only the system administrator has the password to launch a session as root, i.e. in superuser mode. Systems even exist on which it is not authorized to connect as root.

The volume of data processed by a data processing system, in particular for the execution of certain information technology applications on an industrial scale, frequently reaches several terabytes. Such volumes of data cannot be stored in the random access memory of the computer. Moreover, long-term storage, in a persistent memory, is also necessary to allow backup of the data processed or to be processed for a future use. The principle employed to respond to this problem consists of storing these data in storage peripherals in the form of files, i.e. sequences of blocks. A block is the smallest unit that the storage peripheral is capable of managing. More precisely, these data files are stored in one or more blocks of the media of the storage peripheral, according to the size of the corresponding file. The content of these blocks, which is a simple sequence of binary data, can be interpreted according to the file format as characters, integers or floating-point numbers, machine operations codes, memory addresses, etc. Exchange between the two types of memory, namely the random access memory in which the data are processed and are only in transit, on the one hand, and the persistent memory in which the data are stored in a more durable manner, even if only temporarily, on the other hand, is then done by transfer of blocks.

The above can be summarized by stating that the application programs run on a computer incessantly create, modify and destroy data files in the persistent memory of the machine, either for the purposes of temporary processing that would risk saturating the random access memory of the machine, or simply for storing their live data in a persistent manner. The objective of a file system is to allow access to the content of the files thus stored (opening the file, saving, copying or moving it into a second location, or deleting it) starting from their access path, formed of a name preceded by a list of embedded directories (see below).

Furthermore, the persistent memory of a computer also, even principally, has the function of storing the files that form part of the operating "structure" of the machine, i.e. the system programs, on the one hand, and the application software, on the other hand. This software is more or less complex, installed in "resident" mode on the computer with a view to providing a range of services, locally and/or over a network. System programs are called by the operating system, of which they form part, or by application software, as applicable. Application software is launched by a user in order to provide a business service.

The files corresponding to the executable code of these programs, or program files, are also stored in the persistent memory in the form of blocks of data, with execute access rights (x). They are managed by the file system in the same way as the data files. For the sake of clarity for the reader, in the figures of the drawings and in the corresponding parts of the present description, executable files are denoted with a suffix such as "exe", although such a suffix is not a usual practice under Linux™ (nevertheless without being prohibited; executable files simply having no specific extension under Linux™), while this suffix is specific to the operating systems of the Windows™ family.

Furthermore, each file, whether a data file or a program file is concerned, is described by metadata, the number and function thereof depending on the underlying operating system. The most usual metadata comprise, non-limitatively:

- read, write and execute access rights, according to the user;
- dates of file creation, last access and modification of the metadata, modification of the data, etc.;
- name of the file owner;
- size of the file, for example in number of bytes;
- number of filenames (links) pointing to the file;
- number of blocks used for storage of the file;
- type of file: simple data file, symbolic link, directory, peripheral driver, executable program file;
- etc.

Finally, a list of permissions is associated with each file, which determine what each user has the right to do with the file. It is recalled that under Linux™, directories are also files. As a result, rights over directories (and also peripherals, etc.) function exactly the same as on ordinary files.

Rights over a Linux™ file are assigned to three different possible "actions":

- read (r): it is possible for example to read the file with software. When this right is allocated to a directory, it authorizes read access to the contents of the directory (the list of the files present at the root of this directory);
- write (w): it is possible to modify the file and remove its content. When this right is allocated to a directory, it authorizes the creation, deletion and renaming of the files that it contains, regardless of the access rights of the files of this directory (even if they do not themselves have write rights); and,
- execute (x): the file can be executed if this is provided for, i.e. if it is an executable file. When this right is assigned to a directory, it authorizes access to the directory (or opening). The term "flags" is sometimes used for r, w and x. On a given file, these three flags must be defined for its owner, its group, and also for other users (different from the owner and not belonging to the group). Generally, only the superuser (root) and the owner of a file can change their access permissions.

The codes u, g and o ("user", "group" and "others") are used by the Linux™ commands to assign the rights and membership of the files to different entities, which can be the owner, the group and the other users, respectively. From the point of view of representation, the set of the three rights for three entities are generally represented as follows: the rights r, w then x respectively are written side by side for the owner (u), the group (g) and the other users (o), successively. When a flag is assigned to an entity, this flag (r, w or x) is written, and when it is not assigned, a dash ("-") is written instead.

The problem of live data integrity, i.e. of the data files, is treated very differently to the problem of the integrity of the code, i.e. the program files. In fact, the application programs have a relatively long lifecycle (installation, updating, uninstallation), while the live data are modified almost continuously.

For this reason, the embodiments described in the present disclosure only cover control of the integrity of the program files.

With reference to the functional diagram of FIG. 1, a description will now be given of the very simplified architecture of a computer according to the layers model already mentioned above.

The data processing system or computer 1 as shown comprises elements constituting the hardware 10, surmounted by the operating system 20, on which application programs 31 to 34 run in the application layer 30. These application programs can be launched by one or more users having opened a work session on the data processing system 1. They can be launched automatically on startup without opening a work session. An interaction with a human user is not always necessary. Such application programs provide business services to users. It may involve respectively, for example text processing software, spreadsheet, internet browser, database management software, a simulator in the field of scientific computing, etc.

In the example shown, the hardware 10 comprises:

- persistent storage media or peripherals 11, as one or more hard disks (HDD), one or more CD-ROM readers/writers, one or more SSD disks, one or more USB keys, etc.;
- random access memory 12 or volatile memory as integrated circuit "RAM strips", for example NVRAM, SRAM, SDRAM technology memory chips or another;
- one or more integrated circuit processors (CPU) 13, for example general-use multicore processors, graphical processing units (GPU), dedicated processors for certain particular tasks (also called coprocessors), etc.; and,
- input/output (I/O) processors 14, for example a screen and a keyboard, and also optionally a mouse, printer, document scanner, webcam, speakers, audio headset, microphone, etc.

The operating system 20 comprises in particular the software elements shown in FIG. 1, which are from bottom to top:

- the core (kernel) 21, which comprises the command interpreter (shell) and which is also tasked, among other tasks, with applying the security rules, in particular the file access rights;
- the memory manager 22, or memory management unit (MMU), which is tasked with managing the main memory (or random access memory);
- the input/output manager (I/O manager) 23, which provides the execution of the input/output commands received from the applications;
- the file system (filesystem) 24 which is tasked with managing the secondary memory (or persistent memory) on the storage peripherals; and,
- the scheduler 25 which manages the multiprogramming, the timesharing and the parallelism.

The file system 24 is the portion of the operating system 20 that is responsible for managing the storage peripherals 11. It is tasked with the storage of the files on the hard disk, for example their arrangement in directories, opening or closing files/directories, etc.

It will be recalled that all the storage memories are divided into sectors of fixed size, all of which have an address. Current file systems do not always work on the basis of sectors, but use clusters, groups of several consecutive sectors. The address of a cluster is that of its first sector. The size of a cluster depends on the file system used, and can sometimes be configured. For example, Windows™ makes it possible to use cluster sizes comprised between 512 bytes and 64 kilobytes.

The directories are organized in a directory hierarchy: a directory can contain other directories, and so on. This involves a logical tree structure, independent of the physical location of the various subdirectories, which can be extended over several partitions of the physical memory included on one or more disks, and even on network disks. This hierarchy starts with a master directory, right at the top of this hierarchy, called "root" (not to be confused with the root user, which is the system administrator). Under Linux™, there is only a single root, which is denoted by a slash "/", which is therefore the summit of the hierarchy, and each partition of the memory space is a directory accessible from the root. These directories are called mounting points. A person skilled in the art will appreciate that the mounting points are not necessarily directly below the root. A mounting point can even be situated in a tree structure that itself is a mounted partition. In this case, the order of mounting of the partitions assumes a quite particular importance. In order to find the location of a file, in fact, a request must state the path to be followed, for example starting from the master directory, i.e. from the root: specifying that such a directory must be opened, then such another, and so on until the designated folder is reached. This path from the root to the file is called the absolute access path. Under Linux, the names of directories are separated by a "/" as in this example: /usr/ast/mailbox. The tree structure of the Linux system has a standard structure, with extensions imposed by the distributions. Regardless of the operating system, any modification of the file system structure is the exclusive competence of the administrator, with the exception of the personal directories located in /home, which is the root of the personal directories of the users.

Figure 2:
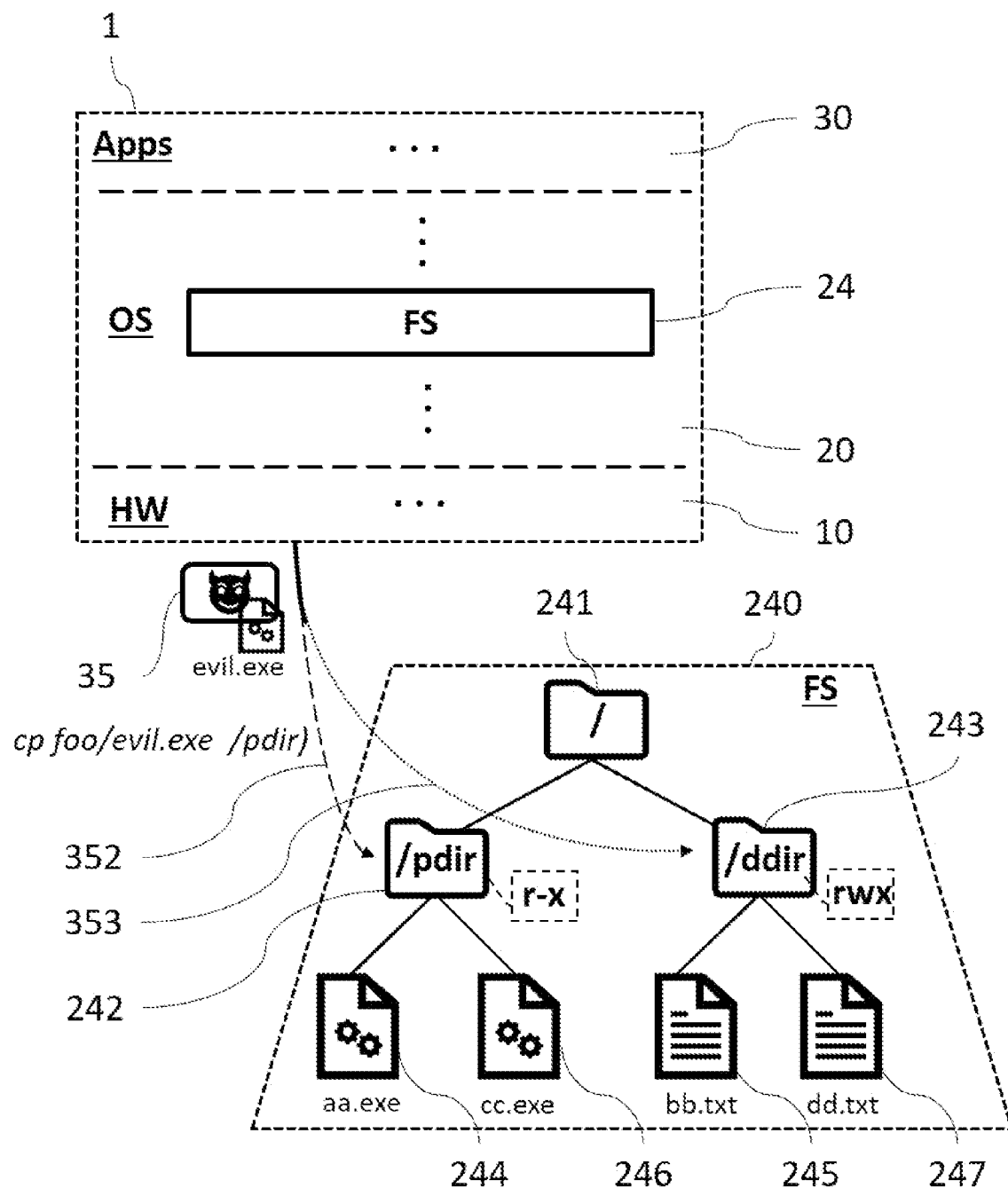
FIG. 2 is a simplified diagram of an example file management system of the data processing system in FIG. 1.

With reference to FIG. 2, the principle that is the basis of the dynamic integrity control method according to embodiments of the invention will now be disclosed. FIG. 2 shows a partial representation 240 of the hierarchical organization of the file system 24 of the operating system 20 of the computer 1 in FIG. 1. For the sake of clarity in FIG. 2, a pared-down version of the computer 1 is shown, with respect to the representation given in FIG. 1. In this partial representation 240 of the file system, at the top of the tree structure the root directory 241 is shown and can be recognized by virtue of a slash symbol "/". The file system thus shown comprises only two directories 242 and 243, each mounted from the root 241.

The first directory 242 is called /pdir in this example, and has the feature of containing files, for example program files, the integrity of which must be verified. These may be for example executable files such as the files 244 and 246 shown, named aa.exe and cc.exe, respectively. It will be recalled that the extension .exe given here to the names of the executable files is not a usual measure under Linux™ but is adopted here to make it possible to distinguish an executable file from a data file such as a text file for example. The directory 242 can also contain other types of files, such as data files.

The second directory 243 is called /ddir in this example, and has the feature of containing, a priori, data files only, for example text files such as the files 245 and 247 shown, named bb.txt and dd.txt, respectively. It will be seen below that, by virtue of a filter mechanism for example by a denylist of files not to be controlled, the directory 243 can optionally contain program files without detracting from the effectiveness of the method for dynamic control of the integrity of the program files of the directory 242. However, initially, it is assumed that as a result of specified usage rules, the directory 243 in principle does not contain any program file.

A person skilled in the art will appreciate that the names of directories 242 and 243, namely /pdir and /ddir, respectively, are here imaginary names for the requirements of the present description, in order to denote a directory containing program files and a directory containing (a priori only) data files, respectively. However, standard directories of the Linux™ operating system can equally well be concerned, for example. Under Linux™, the directory /pdir can thus, for example, be the standard /bin directory that contains the (binary) executable files relating to the initialization of the system and to the "essential" commands, or the standard /sbin directory that contains the executable files for the administration of the system, or also the standard /usr directory, the function of which is to contain the programs accessible to any users, or also any subdirectory mounted by a user from this mounting point. The directory /ddir can be for its part, for example, the standard /tmp directory provided for the storage of temporary files, or even any subdirectory mounted by a user from this mounting point, or also the standard directory /var that contains the variable data linked to the machine (printer files, http connection traces, etc.).

The directory 242 has another feature. It is locked in read-only. In other words, it is possible to read the files that it contains, but not to write to this directory, which means that it is not possible to add new files, or modify the content of the files which are already therein. Also, it is not possible to modify or add metadata to the files of this directory, as this would amount to modifying the files in question. In short, all the files that it contains can be read, but cannot be modified. For the systems functioning on an operating system also managing an execute permission associated with the files and/or the directories containing files, such as Linux™ marking the directory 242 as read-only clearly does not prevent the execution of the executable files that it contains. In other words, the directory receives "r-x" rights under Linux™ for the entity in question (user, user group, or other users), as indicated in FIG. 2 in a dotted label shown at the bottom right of the directory 242. As for the directory 243, it has no restriction on write permission. In other words, it is configured as read-write. In the example of a computer operating under Linux™ that is under consideration here, it has "rwx" rights as indicated in FIG. 2 in a dotted label shown at the bottom right of the directory 243.

Moreover, the file system 24 of the operating system 20 implements a copy-on-write (COW) mechanism with respect to the program files contained in the first directory 242. This mechanism is configured to provide the creation of a copy of a program file of said first directory 242 in the second directory 243 only, when said file is the subject of a modification command. In other words, any attempted modification of a file of the directory 242, on the one hand is not executed in the directory 242 because it is read-only, as indicated above, but gives rise to a redirection of the corresponding write operation to the other directory 243. The modified file is thus written to the second directory 243, instead of the first directory 242. This takes place transparently for the user and for the calling process. This relates equally well to a modification of the content of a file of the directory 242, as to a modification of its metadata. The directory 243 is thus a write "overlay" initially empty of program files. The COW mechanism is a sort of exclusion mechanism having the effect of separating the modified files, according to whether program files or data files are concerned.

This COW mechanism applied to the directory 242 is shown symbolically in FIG. 2. In this figure, in fact, a malicious process 35 has been represented, which generates a command which for example would be written thus under Linux: cp blah/evil.exe /pdir. This command intends to copy (instruction cp) the executable file named "evil.exe" from any file (blah) to the directory /pdir. If successful, this operation would place the file evil.exe in the first directory 242 as indicated by the dashed-line arrow 352. However, this operation is not executed as such, because the COW mechanism substitutes writing the file evil.exe to the second directory 243, as indicated by the dotted-line arrow 253.

A person skilled in the art will appreciate that the COW mechanism is illustrated by the above example in the case of a write operation of a new evil.exe file to the first directory 242 for reasons of greater clarity of the figure and of the disclosure, but that the COW mechanism would equally well effect the redirection to the second directory 243 of a write of a modified version (potentially corrupted) of the aa.exe file or of the cc.exe file contained in the directory 242.

Similarly, any modification command of one or more metadata of a file of the directory 242, such as the files aa.exe and cc.exe, does not affect the original file in said directory 242 which therefore remains unchanged, but results in a modified version of said file being copied to the second directory 243. The file management system 24 is also configured so that, subsequently, any access to the file concerned is in fact performed on the modified version, as copied to the second directory 243.

The embodiments exploit this characteristic of the COW mechanism in an advantageous manner, in order to propose an effective mechanism for verification of the integrity of the files of the first directory 242. In fact, any modification of one of the files of the first directory 242 is reflected, as a result of the application of the COW mechanism, by the presence of a corresponding file, or file image, in the second directory 243. This is the case both for a modification of the content of one of these files and for a modification of its metadata. A procedure for controlling the integrity of the files of the first directory 242 can thus consist, quite simply, of verifying the possible presence of such a file image associated with these files in the directory 243. Such a control procedure can be initiated, for example, at determined time intervals, for example at periodic time intervals, or in response to certain events or certain interruptions. If a file is found in the second directory 243 that corresponds to one of the files of the first directory 242, which is configured as read-only, because the files that it contains are for example sensitive files from the point of view of security, then that is interpreted to mean that this file has potentially been corrupted. Any corrective action can then be implemented, in order to mitigate this security attack.

From the point of view of the architecture of the file system, the logical link between the first directory 242 and the second directory 243 can be created by a mounting known as "union mount", which is most widely accepted to mean a mounting mechanism making it possible to join several file systems in a single virtual file system, generally with one of the two file systems mounted as read-only, while the second allows write access. The best-known implementation of this under Linux™ is Unionfs, while alternatives are called Overlayfs and Aufs.

File systems of the "union mount" type are a solution to allow virtual merging of several folders, while keeping their actual contents separate. The overlay file system ("Overlayfs" as it is called under Linux™) is an example thereof. A person skilled in the art will appreciate that, like Unionfs and Aufs, Overlayfs is more a mounting mechanism than a file system per se.

Introduced into the "mainline" of the Linux core with version 3.18, Overlayfs makes it possible to overlay the contents (files and directories) of one directory on another. Source directories can be on different volumes and can even be different file systems, which creates a beneficial mechanism for allowing temporary modification of read-only files and folders. In fact, as certain file systems are structurally read-only (the write operation never being possible); their use can be beneficial in the framework of embodiments of the invention, because in this case the read-only access mode of the first directory 342 is no longer a component of this implementation, but becomes structural.

Figure 3:
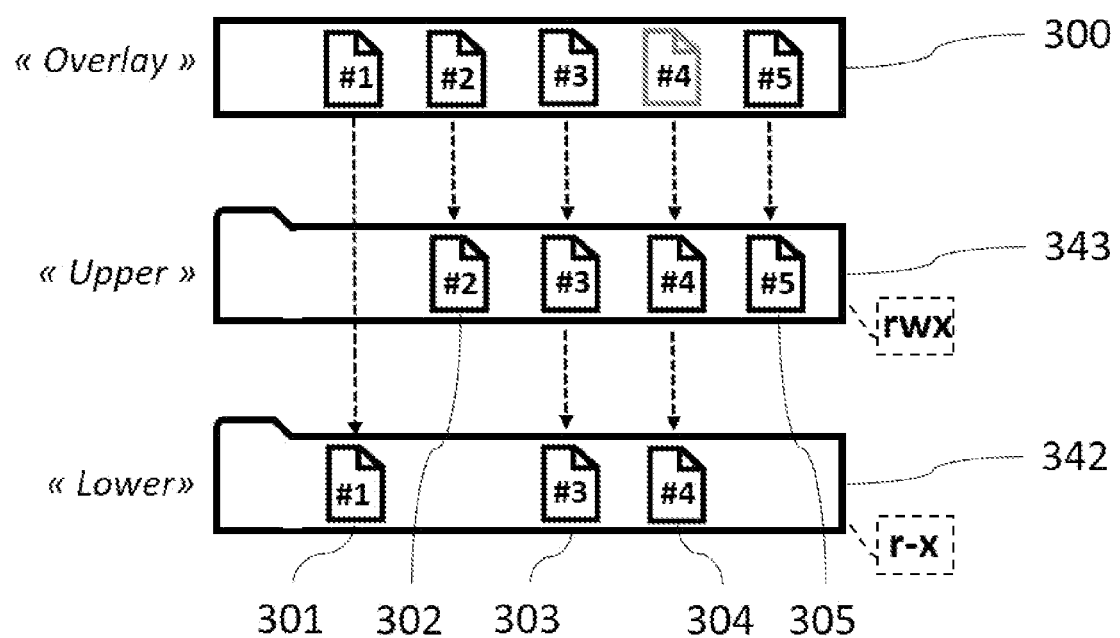
FIG. 3 is a functional diagram showing a first example of implementation of the steps of the method, in the context of an overlay file system.

With reference to FIG. 3, the simplest case of an overlay file system involves two directories, each being capable of containing files and directories, and organized in layers from the logical point of view. More specifically:
- a lower layer 342, or lower directory, which is configured as read-only;
- an upper layer 343, or upper directory, which is write-accessible; and,
- a superimposition layer 300 ("overlay layer" or "merged layer") which gives the overall presentation of the two layers, with the rest of Linux and applications positioned above this.

The overlay layer 300 is by way of being the mounting point of the file system, or rather, of the mounting mechanism, including the directories 342 and 343. Access to a determined file is carried out by means of the overlay layer 300. Everything takes place as if the overlay layer 300 gives visibility into the superimposition of overlays each corresponding to one of the directories 342 and 343. An access command to a file 301, which is carried out via the representation thereof in the overlay layer 300, firstly recovers the file from the upper directory 343, or (by default) from the lower directory 342 if the file 301 does not exist in the upper directory 343.

From the functional point of view, the lower directory 342 and the upper directory 343 can be considered as the first directory 242 and the second directory 243 respectively, of the file system 24 in FIG. 2. In other words, a copy-on-write (COW) mechanism such as that described with reference to the diagram in FIG. 2 exists between the lower directory 342 and the upper directory 343. Owing to this COW mechanism, if an existing file in the lower directory 342 is modified, in the knowledge that the lower directory 342 is read-only, the file update is created in the upper layer 343, and it is this update that will subsequently be taken into account in the presentation within the overlay layer 300, for all access to the file in normal mode ("user" mode).

In fact, any modification made to a file starting from the lower directory 342, such as the file 303 shown, creates a copy of said file in the upper directory 343, and this copied file will be the modified version of the file, which will subsequently be accessible to any read command relating to this file. This leaves the original file 303 intact in the lower directory 342, and available by virtue of a direct access to said lower directory 342 (in superuser mode), for example in the event of the need to recover this file 303. If necessary, it is thus possible to return the system to its initial state by deleting the contents of the upper directory 343, (with the loss of any useful data), which makes it possible to add resilience to the system.

Moreover, a file deleted from the lower directory 342, as with the directory 304, also creates a sort of copy of said file, which is a file called a "whiteout" file, in the upper directory 343, and this deletion has the effect that said whiteout file is no longer directly accessible via the overlay layer 300. This is symbolized in FIG. 3 by the representation of the file 304 in grey in the overlay layer 300. A person skilled in the art will appreciate that this is not a copy in strict terms, since the whiteout file does not contain any data. Only the name (and the relative location) of the file are copies of the original.

On the other hand, creations of new files or modifications made to files that only exist in the upper directory 343, which is read-write accessible, take place in the usual manner, as for the file 302 and the file 305 as shown. Such files can in particular be data files, temporary files, etc. They can be created, modified and deleted from the upper directory 343 without any particularity.

A person skilled in the art will appreciate that what has been described above for files is also valid for subdirectories, in the same way. When a subdirectory of the lower directory 342 is whited out, a subdirectory known as an "opaque" directory is created in the upper directory 343, which is as it were equivalent to a whiteout file, for a whiteout file of the lower layer 342 such as the file 304 shown.

The solution according to embodiments of the invention consists of taking advantage of the characteristics of an overlay file system of the "Overlayfs" type under Linux™, in order to provide an integrity control solution for a set of files to be controlled, for example a set of program files. Advantageously, the core of the control mechanism (Overlayfs) is situated in the kernel space of the operating system, and not in the "user" space and it is therefore more difficult for an attacker to corrupt.

As previously observed, by using a mounting of the "Overlayfs" type for controlling the integrity of the files contained in a directory 342 used as the "lower" directory of the mounting, controlling the contents of the "upper" directory 343 is sufficient to determine the modifications made to the files of the directory to be controlled. To this end, it is ensured that the lower directory 342 is in fact configured with read-only permission in normal user mode, so that modifications cannot be made to it directly, except of course in superuser mode. The method then consists of carrying out a control, for example periodically, of the contents of the upper directory 343 in order to identify modifications that would reveal a violation of the integrity of the files of the directory 342 containing the sensitive files.

In one case, the appearance of a file in the upper directory 343 would be the sign of the violation of the integrity of the lower directory 342. A person skilled in the art will nevertheless appreciate that in practice, certain modifications of the contents of the upper directory 343 are legitimate and others are not. Typically, where a sensitive file is contained in the lower directory 342 which is an application program, read access to the corresponding program file that is contained in the lower directory 342 is carried out for the execution of the program, but the file per se, which contains the application code, is in principle not likely to be modified (at least in normal operation, i.e. in normal user mode), while one or more user data files and/or one or more temporary files relating to the execution of the program can be created in the upper directory 343, and the data that are saved therein can subsequently be modified at any time.

A list of subfiles and/or files of the upper directory 343 that are subdirectories and/or files not to be controlled, can be established beforehand, i.e. before the control, depending on the expected contents of the upper directory 343 to be controlled. Typically, this list contains the paths of the directories and files that are not to be controlled, for example directories of temporary files and user data files.

Figure 4A:
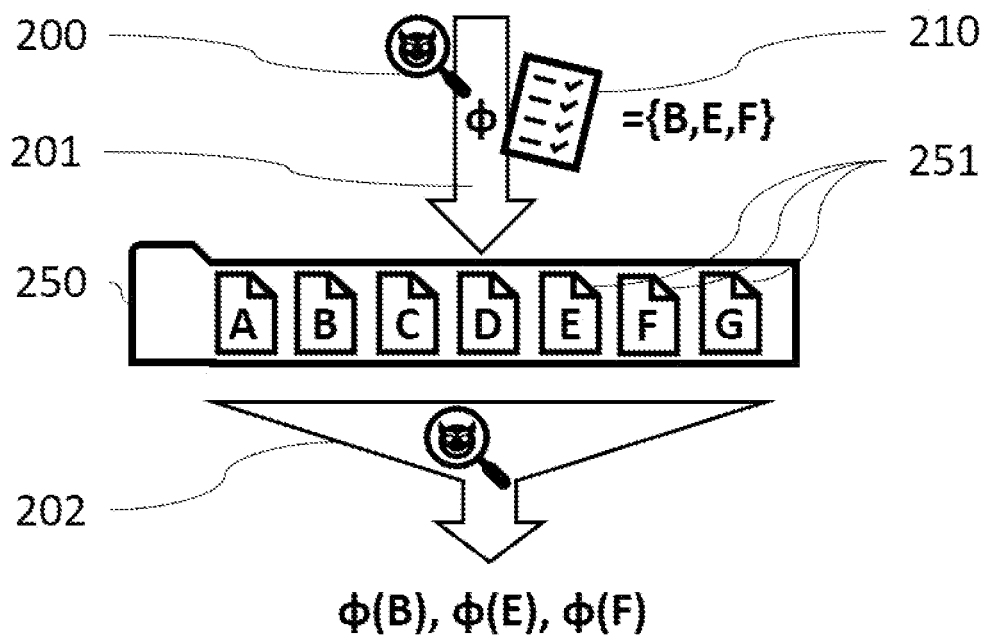
FIG. 4a is a functional diagram showing the use of an "allowlist" within the meaning of the present description.

The principle of use of such a list of files not to be controlled, called "denylist" in the context of the present description, will be explained with reference to the functional diagrams in FIG. 4a and FIG. 4b. FIG. 4a will be described and discussed first, because it illustrates the use of a list known as an "allowlist" as opposed to a denylist according to embodiments, which will be more intuitive for a person skilled in the art. Then turning to FIG. 4b, the principle of the denylist is illustrated, in symmetrical manner. As a person skilled in the art will appreciate, the term "denylist" refers to an exclusion list (here, exclusion from control), while an allowlist would be an inclusion list (in this case, inclusion in the control).

Figure 4B:
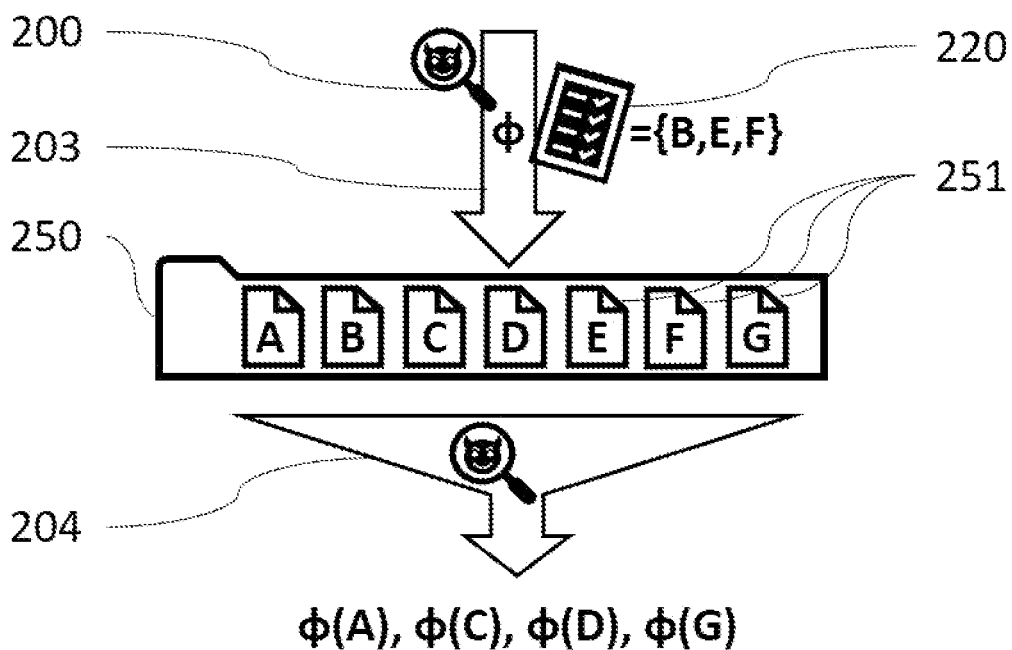
FIG. 4b is a functional diagram showing the use of a "denylist" within the meaning of the present description.

In FIGS. 4a and 4b, a directory 250 is shown, which could be the directory 243 in FIG. 2 or the upper directory 343 in FIG. 3. This directory contains a set of files 251, namely seven directories, each identified by a letter A, B, C, D, E, F or G, respectively, in the figures. It can be assumed that these letters correspond respectively to the name of each of the files. Moreover, an operation 200 applied to the contents of the directory 250 is also labelled with the Greek letter Phi. This can be any integrity control function whatsoever.

With reference to FIG. 4a, when it is applied in step 201 to the files 251 of the directory 250 in connection with an allowlist 210 that contains in the example the identification of the files B, E and F, this operation produces, in step 202, results Phi(B), Phi(E) and Phi(F). These results correspond to the application of the Phi function only to the files of the directory 250 that are identified in the allowlist 210. In other words, the Phi function is applied to all the files of the directory that are listed in the allowlist 210. The other files of said directory 250 are not concerned by the application of the function in 201. This can be understood by considering that the allowlist is a filter through which the Phi function is applied, positively, to the contents of the directory 250.

Conversely, this time with reference to FIG. 4b, when the Phi function is applied in step 203 to the files 251 of the directory 250 in connection with a denylist 220 that in the example also contains the identification of the files B, E and F, this operation produces, in step 204, results Phi(A), Phi(C), Phi(D) and Phi(G). These results correspond to the application of the Phi function to all the files of the directory 250 except those that are identified in the denylist 220. In other words, the files B, E and F of said directory 250 that are identified in the denylist 220 are not concerned by the application of the function in 203. This can be understood by considering that the denylist 220 is a filter through which the Phi function is applied, negatively, to the contents of the directory 250.

Returning to FIG. 3, a control of the upper directory 343 that is applied to said directory in connection with a denylist listing files of user data, directories of temporary files, or others, is applied to all the objects of said upper directory 343 except those thus listed in said denylist. As already stated, in the embodiments of the method such a control can be summarized as controlling the presence in the upper directory 343 of files that correspond to modifications made to the files of the lower directory 342. More generally, the control can aim to detect the presence of objects in the upper directory 343 that reveal modifications made to objects of the lower directory 342. Applied in connection with a denylist of objects of the upper directory 343, this control ignores, i.e. disregards, said objects of the upper directory 343 listed in said denylist.

The integrity control mechanism of the files of the lower layer 342 by identifying the possible presence of a corresponding file in the upper layer 343 makes it possible to detect the addition of unwanted files in the upper directory if they are not situated in zones excluded from control by virtue of the denylist. With such a mechanism based on a denylist, consequently, it is not necessary to inspect the files to be controlled one by one, because the upper directory 343, filtered by the denylist, contains only the modifications made to the lower directory 342.

As mentioned, the invention can operate with the implementation of a list called "allowlist" corresponding to a list of files of the second space that are to be controlled during the integrity control. In this context, the method according to the invention could be implemented in such a way that the dynamic inspection 55 of the method according to the invention corresponds to a dynamic inspection, at predetermined times during the operation of the computer, of the second memory space in order to identify therein a copy of at least one file included in the files of the allowlist. Then, as described, it includes the detection 56 of an integrity violation of a file among the files the integrity of which must be controlled, stored in the first memory space if a copy of said file is identified in the second memory space.

The use of a control mechanism in connection with a denylist or an allowlist presents many advantages with respect to the mechanisms functioning in connection with an allowlist such as those provided with tools such as Tripwire™ or AIDE™.

The proposed mechanism, whether based on an allowlist or a denylist, is based uniquely on the simple presence of files in the upper directory filtered by the list created. No hashing calculation for calculating the fingerprints of the objects the integrity of which must be verified, or any control on the metadata of the files, are necessary.

Moreover, advantageously the control is based on a denylist and not on an allowlist; this makes it possible to prevent the risk of omitting a file or a directory from the elements to be controlled, since all the files and directories are controlled by default, i.e. if they have not been specifically included in the denylist.

Furthermore, a mechanism based on an allowlist such as that used in a tool like Tripwire™ needs to be reviewed at each update of the system or of the applications controlled, as a result of modifications of the values of the files, their date or other metadata, which are included in the allowlist. The mechanism in connection with a denylist as proposed in the embodiments does not have this drawback, since the denylist identifies the files that are not controlled.

Constituting an initial allowlist or denylist is much easier than constituting the allowlist of the systems of the Tripwire™ type, because it does not require preinstallation of a "reference" system for calculation thereof. In fact, it does not need any hashing calculation to constitute a fingerprint of files or metadata values, with a view to comparing them subsequently with the product of the same calculations carried out at each iteration of the control mechanism.

In summary, the proposed mechanism is very simple, very efficient, has a low impact in terms of system resources and is adaptive, as it does not require modification in the event that new metadata must be taken into account.

Referring now to the flowchart in FIG. 5, the steps of embodiments of the proposed integrity control method will now be described. These steps are implemented, for example, at least partially, by a process of the operating system which runs in the background.

A person skilled in the art will appreciate that the control mechanism itself as well as the denylist are preferably placed in a zone of the operating system that is protected by a lower-level integrity control system to ensure that they cannot themselves be changed.

In step 51, the sensitive files to be subjected to an integrity control according to the mechanism are identified. This step can be implemented, for example, once on startup of the data processing system. The files concerned are for example program files corresponding to programs that are sensitive from the point of view of the security of the data processing system. These may be program files corresponding to security applications. Alternatively, the non-sensitive files to be excluded from an integrity control could be identified. The files concerned are for example user files that are frequently modified and not very sensitive from the point of view of the security of the data processing system.

In step 52, memory space is allocated in the persistent memory 11 (FIG. 1) of the computer, for a first directory that can be the directory 242 in FIG. 2, for example. Also, memory space is allocated in the persistent memory 11 of the computer, for a second directory that can be the directory 242 in FIG. 2. The sensitive files identified in step 51 are saved in the first directory thus allowed, optionally with files that are not sensitive. Then this first directory is locked as read-only. Moreover, a copy-on-write (COW) mechanism is installed between the first directory and the second directory, so that any modification of a file of the first directory is revealed by the copy of the modified version of said file in the second directory. These operations can be carried out, under Linux™, by means of the mounting function of a correctly parametered file mount system.

In a variant, step 52 comprises mounting an overlay file system, with a "lower" directory that corresponds to the first directory above, and an "upper" directory that corresponds to the second directory above. More particularly, this means that the lower directory contains the sensitive files for which the integrity control must be implemented. And it is locked as read-only. This result can be obtained, under Linux™, by means of the correctly parameterized mounting function of an overlay file system Overlayfs. This command allocates memory space in the persistent memory of the computer for the first directory 342 or lower directory of the modes of implementation with an overlay file system described above with reference to FIG. 3. The command also allocates memory space for the second directory 343 or upper directory in FIG. 3.

Figure 5:
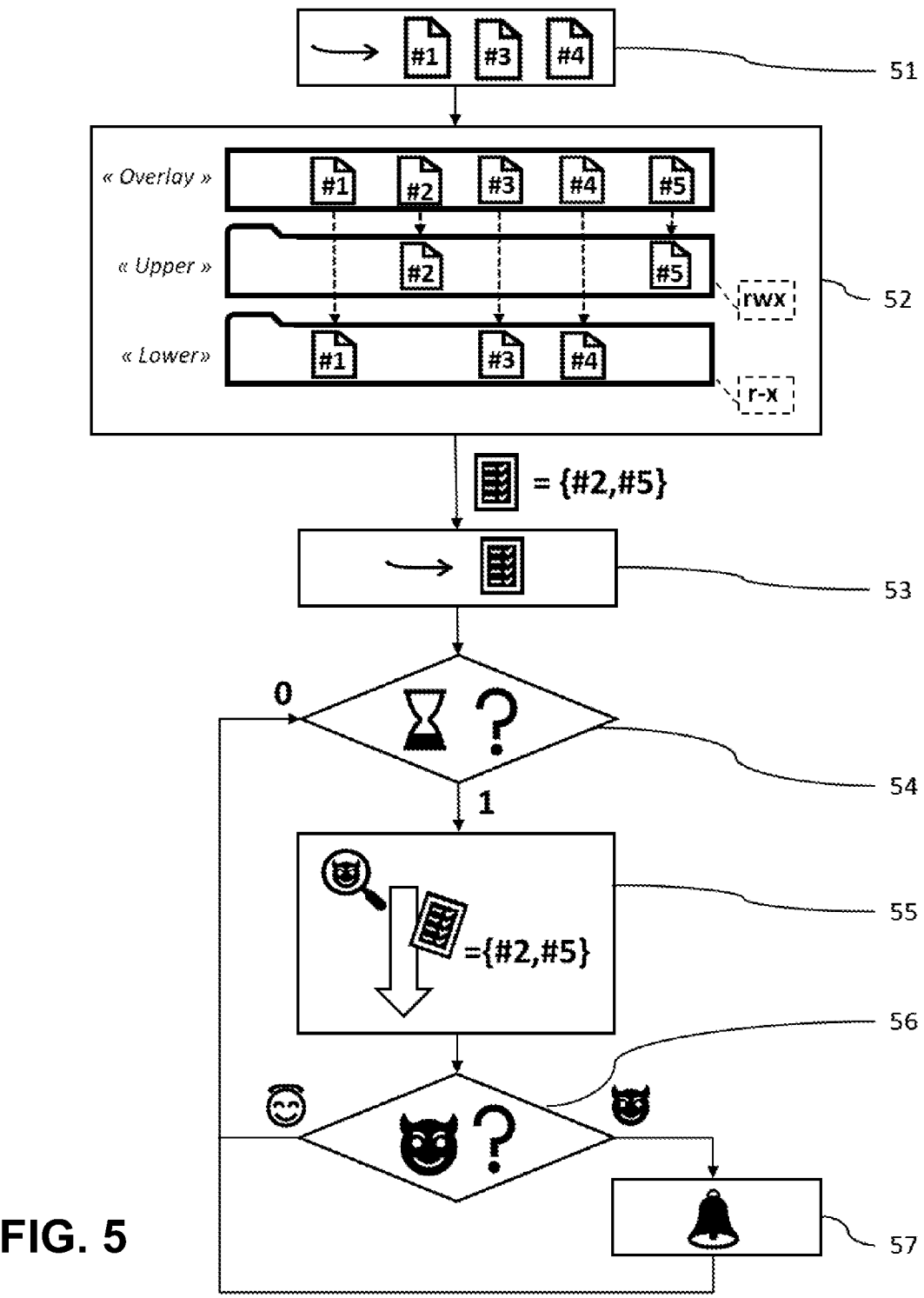
FIG. 5 is a diagram of steps showing a mode of implementation of the method in a data processing system using the concept of virtualized containers; and, FIG. 6 is a functional diagram showing another example of implementation of the steps of the method, in the context of containerization.

In the example shown in FIG. 5, the first directory or lower directory contains three files identified by their respective names #1, #3 and #4, while the second directory or upper directory contains two files identified by their respective names #2 and #5, for example data files. In the event that the integrity control mechanism uses a denylist as filter used for the inspection of the second directory or upper directory, this denylist must identify the zones of the persistent memory of the computer in which the files #2 and #5 are stored. It is recalled that the files thus listed in the denylist are the files that are not to be controlled.

In embodiments, the denylist as defined above is created in step 53. Preferably, the denylist forms part of the input data of the method according to the invention, for example in the same way as the files the integrity of which must be controlled by the invention.

In the optional step 54, it is queried if a time interval has elapsed, in order to proceed to an integrity control of the second directory or upper directory. If not, the method waits until the determined time interval has elapsed.

If on the other hand it is determined in the optional step 54 that the determined time interval, for example sixty seconds, has elapsed, then an integrity control will be carried out on the second directory or upper directory at step 55, in connection with the list created, in particular the denylist. In other words, all the files of the second directory or upper directory that are listed in the denylist are excluded from the control process carried out in step 55. With respect to this control process, the procedure takes place as if said files were transparent. Alternatively, all the files of the second directory or upper directory that are listed in the allowlist are included in the control process carried out in step 55. With respect to this control process, the procedure takes place as if the other files were transparent.

In step 56, it is then determined if a file from among the files of the first directory or lower directory is likely to have been corrupted. As already disclosed, this is detected by detecting the presence of a copy of such a file in the second directory or upper directory, of course with the exception of the files of the denylist which are disregarded for this detection. Alternatively, with the exception of the files absent from the allowlist that are disregarded for this detection. Otherwise, the method can optionally loop back to step 55 or optionally, if appropriate, to step 54. For example, as soon as a new time interval for carrying out an integrity control has elapsed (step 54), a new control will again be carried out at step 55, and so on.

If on the other hand a file is detected in the second directory or upper directory in step 56, then in step 57, an appropriate corrective action is engaged. This may be generating an administrator alert, for example in a security audit log, in order to make it possible to destroy the corrupted file and if appropriate to restore the original (uncorrupted) version of said file from the lower directory 242 in which this version is still available, in superuser mode. In a variant or in addition, the corrective action engaged can also comprise stopping the data processing system or putting it in safe mode, for example, preventing any execution of the corrupted executable file.

If an integrity violation is detected and a corrective measure taken, the same list, e.g. allowlist or denylist, can be used for the following iteration of the verification.

Another mode of implementation will now be described, in which the concept of containers is used. Containers offer a logical grouping mechanism that makes it possible to extract applications from the environment in which they run in reality. Once extracted, the applications based on separate containers can easily be deployed into any environment, whether a private data centre, the public cloud or also the personal computer of a developer. By virtue of containerization, each task is clearly distributed. Thus, developers can concentrate on the logic and the dependencies of their application, while the information technology teams can focus on the deployment and management of the data processing system, without needing to worry about details such as the version of the software or the specific configuration of the application.

Referring again to the diagram in FIG. 1; rather than virtualizing the hardware 10 as virtual machines (VM) do, containers allow virtualization at the level of the operating system 20, and a plurality of containers run directly above the kernel 21 of this operating system. More particularly, the containers virtualize the processor 13, the memory 12, the storage space 11 and if appropriate the network resources at the level of the operating system 20. This provides developers with a "sandboxed" overview of the operating system 20, logically isolated from the other applications.

Containers are therefore extremely light: they share the same core, start very rapidly, and their execution requires very little memory compared to launching an operating system.

There are a certain number of containerization platforms such as Docker™, for example. Docker™ is a very common Open Source container format, which is why embodiments are described hereinafter based on this format, although a person skilled in the art will appreciate that other containerization platforms can be used, such as Rocket™ (known as "rkf"), the Linux container engine CoreOS™, Jails™ and Iocage™ from FreeBSD™ etc., without exceeding the scope of the invention. Management of the disk space of the management system of Docker containers is based on a system of the Overlayfs type.

Docker™ is a program that makes it possible to create Linux™ containers and install exploitable environments therein, most commonly called "images". The normal operation of the Docker™ file system is as follows:

a Docker image is constituted by a set of read-only overlays (layers); it will be noted that "overlays" are mentioned, rather than "directories", in the context of containers, but the reality is identical because these are subspaces of the storage space;

when a Docker image is executed, the "Docker Engine" creates a temporary file system in which the set of components and the data generated by the container are stored. It relies for this on the copy-on-write (COW) capabilities of the "union file system" (Unionfs), for example, or any other underlying file system which is available, if appropriate by selecting one of the file systems from a plurality of available file systems, this selection being made either automatically by Docker or by the user. In practice, implementing this COW mechanism means that when the same image is instantiated multiple times on one and the same host, the container engine does not create a complete copy of the image but only stores the modifications made by each image in the course of execution. When a container is launched from an image, Docker adds a new read-write overlay to the summit of this overlay stack.

Figure 6:
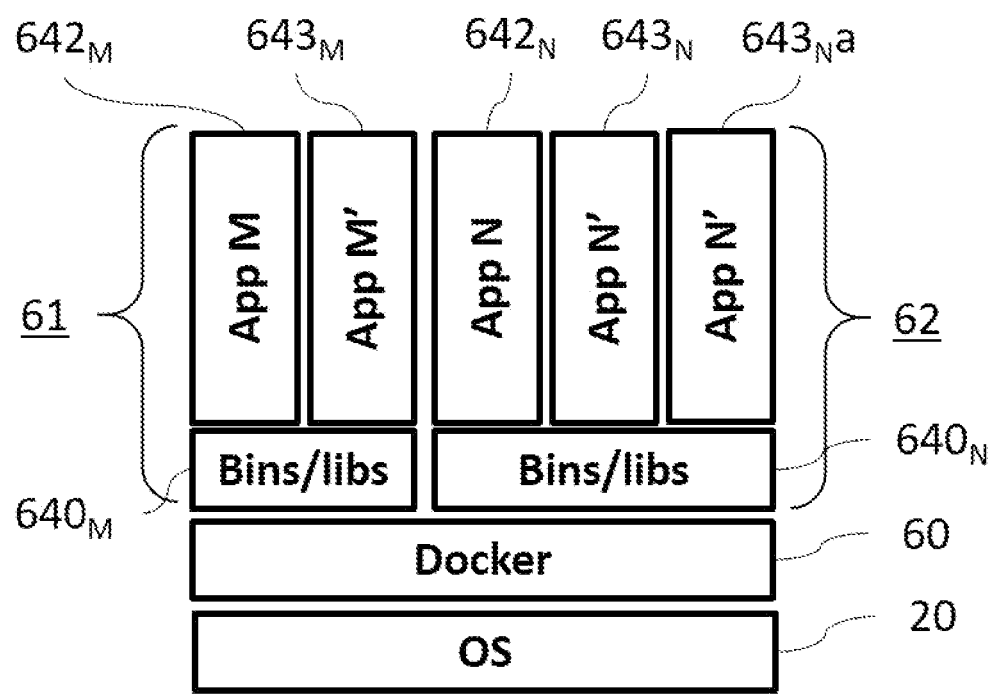

FIG. 6 shows an example of containerization with five containers for the execution of two images M and N on the operating system 20 of the computer 1 in FIG. 1, for example, within two respective environments 61 and 62. The image M is instantiated twice, in the overlay $642_M$ which is read-only, on the one hand, and in the overlay $643_M$ which is read-write, on the other hand. The image N is instantiated three times, in the overlay $642_N$ which is read-only on the one hand, and in the overlay $643_N$ and in the overlay $643_N$a which are read-write, on the other hand. For each image M or N, the containers $642_M$ and $643_M$ or the containers $642_N$, $643_N$ and $643_N$a, respectively, share binary layers and libraries $640_M$ and $640_N$, respectively. Moreover, all the containers share the same operating system 20.

The Docker™ engine 60 manages the modifications of the files within a container as follows (the example of the image M is adopted here):

during a file modification, it creates a copy from the read-only layers $640_M$ and $642_M$ to the read-write overlay $643_M$;

during a file creation, Docker only creates the file on the read-write overlay $643_M$, and does not affect the read-only overlay $642_M$;

during a file deletion, Docker only deletes the file on the read-write overlay $643_M$, and if it still exists in the read-only overlay $642_M$, then Docker keeps it in said read-only overlay.

The same mechanism is reproduced if several copies of the file are made, as is the case for example in FIG. 6 for the image N which is instantiated three times, in the containers $642_N$, $643_N$ and $643_N$a, respectively, with the first instance in a read-only overlay $642_N$ and the two other instances in read-write overlays $643_N$ and $643_N$a.

As the data in the base overlay are read-only, they are protected and left intact by all the operations producing modifications: only the read-write overlay is impacted during data modification. When a container is deleted, the read-write overlay is deleted with it. This means that all the modifications made after the launch of the container disappear with it.

In summary, at the level of the storage space, each container is constituted by several layers or overlays: there is a first layer or lower layer configured as read-only, which is common to all the containers using the same image (i.e. layer $642_M$ for the image M, or layer $642_N$ for the image N) and second layers or upper layers with read-write access pertaining to each container, which contain all the modifications made to the container (i.e. layer $643_M$ for the image M, or layers $643_N$ and $643_Na$ for the image N). This first read-only layer $642_M$ or $642_N$ is thus comparable to the first directory 242 from the principle of the embodiments of the invention described above with reference to FIG. 2, or to the lower directory 342 of the modes of implementation with an overlay file system described with reference to FIG. 3. For its part, the second read-write layer $643_M$ (for the image M) or $643_N$ and $643_Na$ (for the image N) is equivalent to the second directory 243 in FIG. 2, or the upper directory 343 in FIG. 3.

The user creates a container image in its entirety, using the build command of a container platform such as Docker™. This image is stored in the lower layer, accessible as read-only. Any update of the image is stored again in the upper layer. For increased automation, the layers are described individually by the user in a Dockerfile file, then assembled as an image. A container image is thus a static, non-modifiable file. It encloses executable code so as to execute an isolated process in an information technology infrastructure. The image includes the libraries and the system tools, and the other parameters of the platforms necessary for the execution of a software program on the containerization platform. It shares the core of the operating system of the host machine. A container image is built starting from the layers of the file system on a parent or base image. This overlay of layers promotes the reuse of the different components: the user does not start from zero for each project.

The upper layer of a container (or read-write layer) is created and destroyed with the corresponding operations of the container. On this basis the Docker™ technology imposes identifying and storing the user data in separate data volumes so that the latter are not destroyed on destruction of the container. This specificity makes it possible to apply the principle of the invention directly to an integrity control mechanism of the Docker™ containers.

In fact, within the framework of Docker™ the mechanism of Overlayfs on which the invention is based is available natively. In addition, constituting the denylist is facilitated, since all the "user" data must have been identified in advance, must be processed in separate data volumes, and are thus excluded from the read-write layer. Only the working zones such as the temporary directories must therefore be described in the denylist.

Implementation of containerization as with the Docker™ platform makes it possible to have an operating system based on the deployment of applications onboarded in Docker containers. The fundamental principle of such an operating system based on Linux™ and Docker™, for example, is that the payload, i.e. the business application developed by the user (a developer for example) can be fully deployed in the form of Docker™ containers.

In this type of deployment, and when the applications deployed on the hardware are security applications, the implementation of modes of implementation of the invention achieves an effective mechanism making it possible to control the integrity of the code executed in the Docker™ containers. Being deployed in an appliance the hardware resources of which are intrinsically limited, the benefit of such a mechanism arises from the fact that it is efficient, with a low footprint on the calculation power.

Implementation of the integrity control mechanism in the context of a data processing system using the concept of containerization consists of executing regularly, for example periodically (e.g. once per minute, i.e. once every 60 seconds), for example with the aid of the cron service of the operating system, an application developed for this purpose. The parameters of this application are:

its frequency of execution;
the list of the Docker™ containers to be monitored; and
for each container to be monitored, a denylist of the files (and/or directories, in the knowledge that under Linux™ a directory is a file) of said container to be excluded from the integrity control.

At each execution of the application, and for each container present in its list of containers to be monitored, the application identifies the location of the read-write layer of the current container.

The application identifies any files and/or directories situated in this location, excluding from the search the elements mentioned in the denylist.

If one or more files or directories are detected during this operation, this is interpreted as meaning that the integrity of the code has been affected.

In this case, a security audit log can be generated in order to notify the alert, and the system can be restarted automatically, or any other appropriate corrective action can be launched.

In a mode of implementation, the operating system can be configured so that restarting the computer forces the recreation of all the Docker™ containers, thus deleting unwanted modifications, because the read-write layer is deleted and recreated during the operation.

At the cost of a minimal adaptation of the operating system, the implementation of the invention within the framework of the implementation of containers thus introduces high resilience against illegitimate modifications, since the system repairs itself automatically (through an interruption in service) following the restarting of the appliance.

At least one embodiment of the invention has been described and illustrated in the present detailed description and in the figures of the attached drawings, in possible embodiments. Nevertheless, embodiments of the invention are not limited to the embodiments presented. Other variants and embodiments can be deduced and implemented by a person skilled in the art on reading the present description and the attached drawings.

In the claims, the term "comprise" or "include" does not exclude other elements or other steps. A single processor or several other units can be used to implement the invention. The different characteristics presented and/or claimed can advantageously be combined. The presence thereof in the description or in the different dependent claims does not exclude this possibility. The reference signs are not to be understood as limiting the scope of the invention.

What is claimed is:

1. A method for dynamic control, at file level, of an integrity of a set of files stored in a persistent memory of a computer, said method comprising:

allocating a first memory space in the persistent memory of the computer, said first memory space comprising stored files with the integrity of which must be controlled;

allocating a second memory space in the persistent memory of the computer, separate from the first memory space;

locking to read-only, of the first memory space containing the stored files with the integrity of which must be controlled;

implementing a copy-on-write mechanism with respect to the stored files contained in the first memory space, ensuring a creation of a copy of at least one file of said stored files in the second memory space when the at least one file is modified and redirection of all instances of subsequent access to the at least one file to said copy of the at least one file in the second memory space;

creating a list, said list comprising a denylist, of files from the second memory space to be excluded from the integrity of which must be controlled, or said list comprising an allowlist, of files from the second memory space to be included in the integrity of which must be controlled;

dynamic inspection, at predetermined times during operation of the computer, of the second memory space in order to identify said files therein with an exception of the files from the denylist or to identify said files therein from the allowlist;

detecting an integrity violation of a file from among the stored files with the integrity of which must be controlled, stored in the first memory space, if a copy of said file is identified in the second memory space; and at least one predetermined action, executed in response to the detecting the integrity violation of said file from among the files with the integrity of which must be controlled, from the first memory space.

2. The method according to claim 1, in which the list that is created corresponds to said denylist and the dynamic inspection of the second memory space makes it possible to identify files therein, with the exception of the files of said denylist.

3. The method according to claim 2, in which a presence alone of any file in the second memory space with the exception of the files of the denylist is interpreted as the detecting the integrity violation or of a risk of violation of the integrity of a file stored in the first memory space.

4. The method according to claim 1, in which the list that is created corresponds to said allowlist and the dynamic inspection of the second memory space makes it possible to identify files of said allowlist therein.

5. The method according to claim 4, in which a presence alone of any file in the second memory space corresponding to the files of the allowlist is interpreted as the detecting of the integrity violation or of a risk of violation of the integrity of a file stored in the first memory space.

6. The method according to claim 1, in which the stored files with the integrity of which must be controlled contained in the first memory space contain program code associated with security applications, and in which the list that is created is configured to be adapted in order to identify in particular any data file created, modified and/or deleted in the second memory space by said security applications or by other applications with program files of which are also contained in the second memory space, as well as said program files corresponding to said other applications, if appropriate.

7. The method according to claim 1, in which an action executed in response to the detecting the integrity violation of said file from along the stored files with the integrity of which must be controlled from the first memory space is a corrective action, intended to eliminate the file that is identified.

8. The method according to claim 1, further comprising mounting an overlay file system, with as lower directory, the first memory space which contains the stored files with the integrity of which must be controlled and which is marked as read-only, and with as upper directory the second memory space containing any file resulting from a modification, a creation or a deletion of the stored files with the integrity of which must be controlled, from the lower directory.

9. The method according to claim 1, further comprising implementation of a containerization platform, in which each container comprises the first memory space as a read-only overlay common to all containers of said containerization platform using a same file image with the integrity of which must be controlled, and also comprises the second memory space as a read-write overlay specific to said each container and which contains all modifications introduced to the each container.

10. The method according to claim 9, further comprising creation of a list of containers to be monitored, and, for said each container of said list of containers to be monitored, creation of a denylist of files of said each container to be excluded from the integrity of which must be controlled.

11. The method according to claim 10, in which a presence alone of any created, modified and/or deleted temporary file in the second memory space with an exclusion of the files of said each container to be excluded from the integrity of which must be controlled of the denylist is interpreted as the detecting the integrity violation or of a risk of violation of the integrity of said file from along the stored files with the integrity of which must be controlled, stored in the first memory space.

12. The method according to claim 9, further comprising creation of a list of containers to be monitored, and, for each container of said list of containers to be monitored, creation of an allowlist of the files of said each container to be included in the integrity of which must be controlled.

* * * * *